No. 791,879. PATENTED JUNE 6, 1905.
T. P. COLBY.
DRESS FORM.
APPLICATION FILED JULY 20, 1903.
2 SHEETS—SHEET 1.
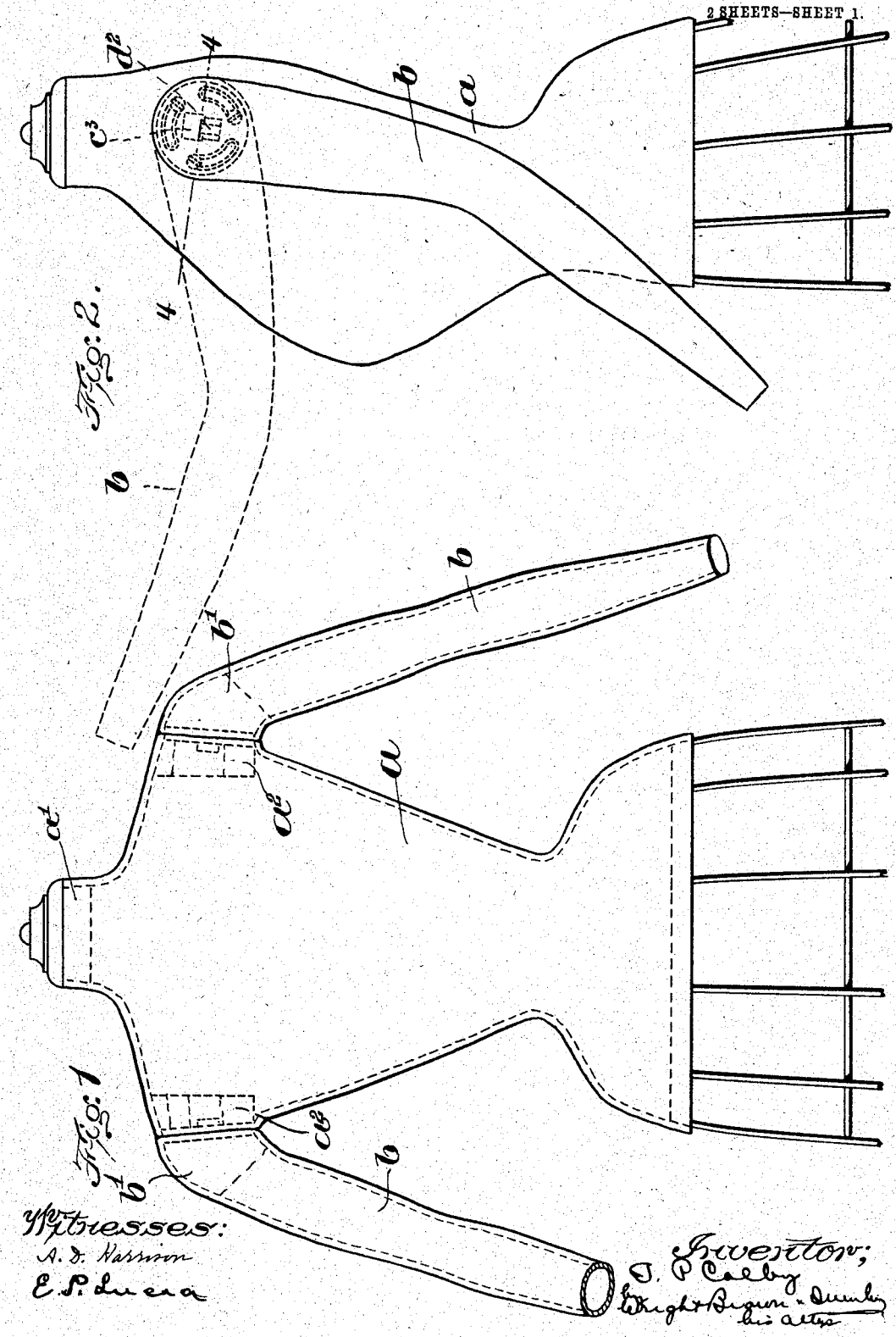

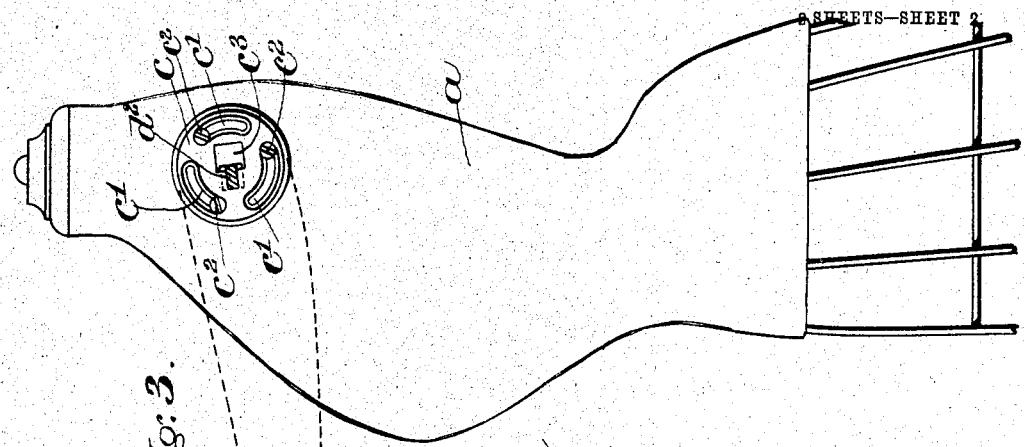
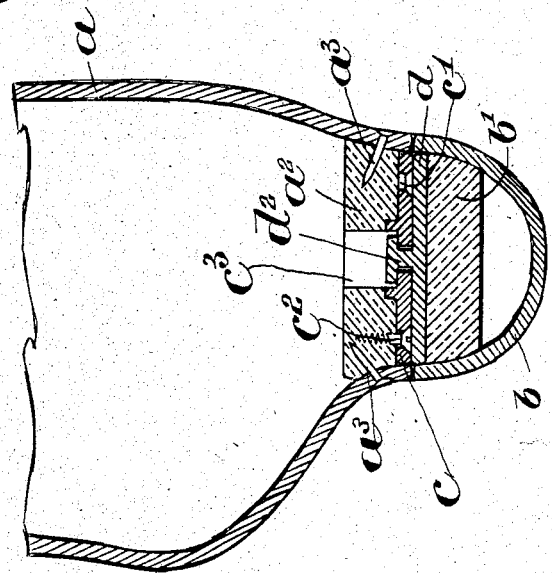
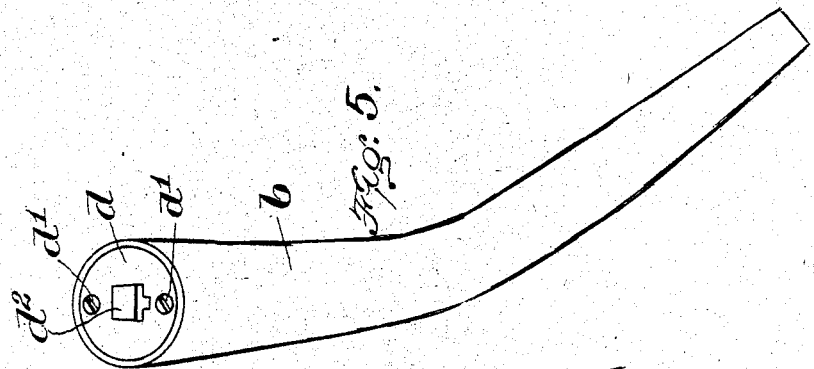

No. 791,879. Patented June 6, 1905.

UNITED STATES PATENT OFFICE.

THEODORE PARKER COLBY, OF BOSTON, MASSACHUSETTS.

DRESS-FORM.

SPECIFICATION forming part of Letters Patent No. 791,879, dated June 6, 1905.

Application filed July 20, 1903. Serial No. 166,208.

*To all whom it may concern:*

Be it known that I, THEODORE PARKER COLBY, of Boston, in the county of Suffolk and State of Massachusetts, have invented certain new and useful Improvements in Dress-Forms, of which the following is a specification.

This invention has relation to dress-forms, having for its object to provide certain improvements therein by means of which the entire dress-waist or a coat may be properly fitted.

It has been customary in dress-forms to have the bust made without arms, so that the dressmaker or tailor was compelled to fit the sleeves upon a separate sleeve-form and then attach the sleeves to the remainder of the garment either by guesswork or with the aid of a human model. According to the present invention the dress-form is provided with detachable arms which are adapted to be rotated about axes substantially parallel to a line connecting the shoulders, so that the dressmaker or tailor can properly drape or fit the sleeves and connect them at their upper ends to the dress-waist and by swinging the arm ascertain whether or not the sleeves will fit properly upon the intended wearer in various positions of the arms. In this way the waist can be fitted upon the body-form and the sleeves separately fitted upon the sleeve-forms, after which the sleeve-forms may be attached to the body-form to permit the attachment of the sleeves to the waist in the proper manner.

On the accompanying drawings, Figure 1 represents in front elevation a dress-form embodying the invention. Fig. 2 represents a side elevation of the same with the arm pendent. Fig. 3 represents a similar side elevation of the dress-form with the sleeve-form or arm detached. Fig. 4 represents an enlarged section on the line 4 4 of Fig. 2. Fig. 5 represents a view of one of the sleeve-forms or arms detached.

The body-form may be full length or it may consist of only the bust, including the neck, shoulders, waist, and upper portion of the hips. This form is indicated at $a$, and it is of any suitable shape, supposedly approximating the shape of the human body. This form may be made of papier-mâché or any suitable material—such as stiffened paper, duck, linen cloth, or the like—and it is preferably reinforced at the neck and shoulders with wooden blocks $a'$ and $a^2$, respectively, as indicated in dotted lines in Fig. 1. In Fig. 4, which is a transverse section on the line 4 4 of Fig. 2, the wooden block $a^2$ is shown as secured in place by nails or other fastenings $a^3$. The sleeve-forms or arms $b$ approximate the shape of the human arm, except that they are minus the hands. These may be made of any suitable material, although it is preferable that both the arms and the body-form $a$ should be covered with some fabric to which the parts of the dress or the dress-lining may be pinned. The arms may be hollow, and in that event in the upper or shoulder ends thereof are secured blocks $b'$ of wood, as shown in dotted lines in Fig. 1 and in section in Fig. 4. The plane of division between the arms and the body may be substantially parallel to a vertical median line of the body and to each other, though this is not essential, as said planes may downwardly converge.

To the arms or sleeve-forms and the body-form are attached complemental coupling members which permit the arms to be independently rotated about axes substantially at right angles to the planes of division between the arms and body, and these coupling members are so constructed that the arms will be held by friction in the positions to which they may be moved. The said members are in the form of plates $c$ and $d$, respectively, the former being secured to one of the blocks $a^2$ and the other to one of the blocks $b'$. The plate $d$ is secured by screws $d'$, as shown in Fig. 5, whereas the plate $c$ is provided with curved slots $c'$, through which screws $c^2$ pass into the block $a^2$, as shown in Figs. 3 and 4, whereby said plate $c$ is adapted to partially rotate about an axis equidistant from the slots and is maintained frictionally in the position to which it may be adjusted. The friction of the plate $c$ relatively to its portion of the dress-form may be varied by adjusting the screws $c^2$ to clamp the plate more or less tightly. The plate $c$ is formed with a keyhole slot or socket $c^3$, adapted to receive a headed or T-shaped stud $d^2$ on the plate $d$. The shank of the stud is relatively thin, so as to fit in the narrower portion of the slot $c^3$, the head of the stud being adapted to freely pass in and out of the larger portion of the slot.

To attach one of the arms or sleeve-forms to the body or body-form, (or to the "support," as it may be termed,) the head of the stud is passed through the large portion of the slot $c^3$, after which the arm or sleeve-form is moved bodily to cause the narrow shank of the stud to pass into the narrower portion of the slot, where it is held from disengagement or movement outward from the body by the enlarged head engaging the inner face of the plate $c$. After the arm or sleeve-form is attached to the plate $c$ the arm may be oscillated from a pendent position, as shown in full lines in Fig. 2, to a substantially horizontal position, as illustrated in dotted lines, where it will remain until readjusted.

It is apparent that the arms may be straight or bent at the elbow, as desired, and indeed in some cases each body-form is provided with a series or plurality of sleeve-forms in which the forearm is bent into different angular positions with relation to the upper arm.

Having thus explained the nature of the invention and described a way of constructing and using the same, although without attempting to set forth all of the forms in which it may be made or all of the modes of its use, I declare that what I claim is—

1. A dress-form comprising a body portion, a detachable arm, and interlocking coupling members secured to said body and arm respectively, the means for securing one of said members providing for oscillation of and providing variable frictional tension of said member relatively to its supporting portion.

2. A dress-form comprising a body, an arm, and means for detachably connecting said arm to said body, said means comprising two plates of which one is rigidly affixed to said arm, and of which the other is provided with segmental slots through which screws are inserted into the body, or vice versa, said plates having a separable complemental stud-and-slot connection, and providing a limited frictional rotation of said plates relatively to one of said portions of said dress-form.

3. A sleeve-form having a coupling member, combined with a complemental coupling member, a support to which said complemental member is pivotally connected, and means for frictionally engaging the complemental member with its support, whereby the complemental member and the sleeve-form engaged therewith may be supported in different positions, the said coupling members being separable so that the sleeve-form may be removed from the support.

4. A sleeve-form support having a coupling-plate rotatably secured thereto, and means for frictionally engaging the plate with the support, the said plate having a socket to receive a coupling member on a sleeve-form.

In testimony whereof I have affixed my signature in presence of two witnesses.

THEODORE PARKER COLBY.

Witnesses:
M. B. MAY,
J. P. IDE.